Patented Aug. 14, 1928.

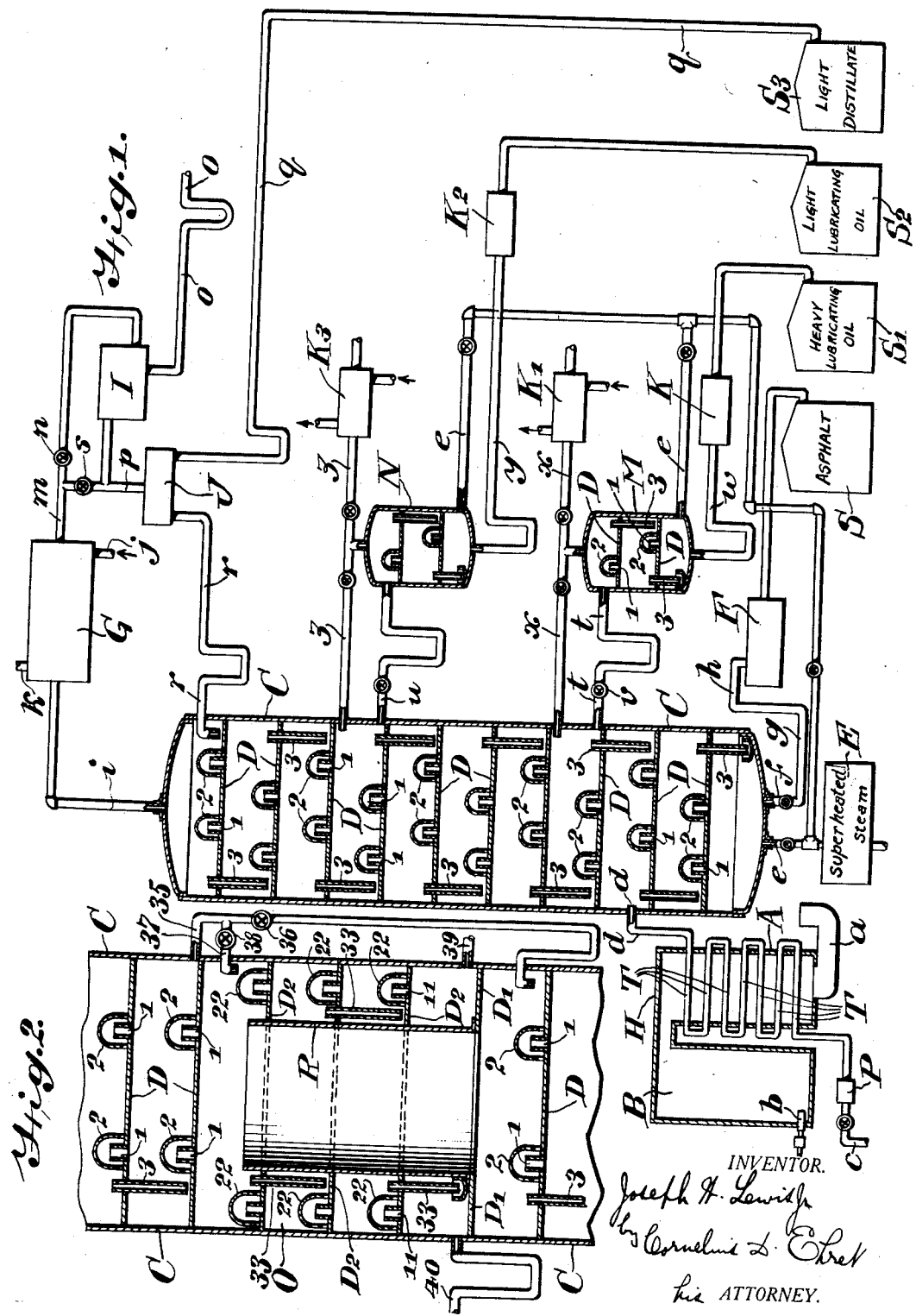

1,680,421

UNITED STATES PATENT OFFICE.

JOSEPH W. LEWIS, JR., OF PHILADELPHIA, PENNSYLVANIA, ASSIGNOR TO THE ATLANTIC REFINING COMPANY, OF PHILADELPHIA, PENNSYLVANIA, A CORPORATION OF PENNSYLVANIA.

FRACTIONAL DISTILLATION.

Application filed March 25, 1926. Serial No. 97,202.

My invention relates to the fractional distillation of a composite liquid, such as hydrocarbon oil, including petroleum, with particular reference to improving the quality of the several fractions.

In accordance with my invention the fractions removed as side streams from the fractionating column are stripped of low boiling constituents which are present due to the substantial equilibrium existing between the liquid oil on each plate and the vapor above it.

More particularly in accordance with my invention, a liquid fraction is removed from the side of the column and while still at a temperature near its boiling point is stripped of its low boiling constituents by counter current treatment with a vapor, as steam.

In fractional distillation in a column of the bubbler plate type, the liquid on each plate is substantially in equilibrium with the vapor passing upward therethrough. Therefore while the major portion of the liquid on the lower plates is composed of high boiling constituents, there is also present an appreciable quantity of low boiling material due to the equilibrium between the liquid and the vapor which latter contains relatively large quantities of low boiling components. Therefore when fractions are removed from various points in the column there is present in each sufficient low boiling material appreciably to affect the physical properties, and in the case of mineral oils, including lubricating oils, to lower the flash-point.

The object of my invention is to remove these low boiling constituents thereby producing a more valuable product.

My invention resides in a method and apparatus of the character herein described.

For an understanding of my method and an illustration of some of the forms my apparatus may take, reference is had to the accompanying drawing, in which:

Fig. 1 is a cross-section of one form of apparatus suitable for carrying out my process.

Fig. 2 is a modification thereof in which the exhausting section is within the column.

Referring to Fig. 1, H is an oil heater of any suitable type, comprising a series of tubes T disposed in the chamber A, from whose lower end are discharged to the flue or stack $a$ the products of combustion resulting from the burning of any suitable fuel, as, for example, oil or gas delivered to the burner $b$ in the combustion chamber B. The oil to be treated is delivered from storage through the pipe $c$ to the pump P, which delivers it at suitable pressure to the inlet of the tube system T and is discharged through the pipe $d$ into the chamber C, which, in the example illustrated, is a fractionating column or tower provided with vertically spaced fractionating members D of any suitable type, such, for example, as bubbler plates, perforated plates, or equivalent. There are provided the vapor uptakes 1, bubbler caps 2 and downflow pipes 3 for the reflux oil. With the bottom of the column C communicates the pipe $e$ through which is delivered steam or equivalent. When steam is utilized, it is preferably previously super-heated as in the super-heater E. Communicating with the bottom of the column C is the pipe $f$, disposed preferably in the form of a trap $g$ at a suitable distance below the pipe $h$ which delivers the bottoms through a cooler F to the storage tank S.

Connected with the upper end of the column C is the pipe $i$ which conducts vapors to the condenser G cooled by any suitable medium, as water introduced at $j$ and discharged at $k$. The condensate, comprising oil and water is delivered through the pipe $m$, controlled by valve $n$, to the water separator I, in which the oil and water separate, the water passing off through the trapped pipe $o$. The oil condensate passes off through the pipe $p$ to the flow box J in which the oil is divided in any desired proportion into streams, one of which passes off through the pipe $q$ to the storage tank $S^3$, and the other of which passes through the trapped pipe $r$ into the upper end of the column C as a reflux stream which flows downwardly through the pipes 3, counter current to the rising vapors.

In case the use of steam is not desired, the water separator I may be cut out by closing valve $n$ and the condensate from the condenser G passed directly from the pipe $m$ through the valve $s$ to the pipe $p$ into the box J.

From suitably different altitudes within the column C may be withdrawn desired fractions or cuts in liquid phase through, for example, several pipes $t$ and $u$, or any other suitable member.

In accordance with my invention these cuts or side streams are operated upon to remove therefrom the low boiling constituents, thereby raising their flash test.

The trapped pipe $t$, controlled by the valve $v$ conducts liquid oil from one of the fractionating plates D of the column C to the auxiliary or side stream exhausting column M which is in effect a small fractionating column, provided with any suitable form of fractionating structure, such as one or more plates D, vapor uptakes 1, bubbler caps 2 and reflux pipes 3. A trapped pipe $w$ leads from the bottom of the exhausting column M through the cooler K to storage tank $S^1$. From the upper end of the column M extends a pipe $x$, one branch of which communicates with the interior of the column C, while the other branch leads to storage or other point of disposal, through a cooler $K^1$, if desired. A branch $e$ of the aforesaid pipe $e$ delivers super-heated steam, or equivalent, into the base of the column M.

The pipe $u$ delivers liquid oil from another fractionating plate D to a second exhausting chamber or column N, similar to M, and similarly connected and operating. The bottom of the exhausting column N connects through the trapped pipe $y$ and cooler $K^2$ with the storage tank $S^2$. The upper end of the column N connects with pipe $z$, one branch of which communicates with the interior of the column C and the other of which delivers to storage or any other desired destination, through a cooler $K^3$ if desired.

The operation is as follows:

The liquid oil and vapor discharged at $d$ into the column C, as from the still or heating structure H, is subjected to the action of steam delivered through the pipe $e$ and to the action of the reflux oil descending through the pipes 3. After suitable fractionating the ultimate vapor is discharged through the pipe $i$ through the condenser G, part of the condensate returning to the pipe $r$ as reflux liquid and the remainder passing into the storage tank $S^3$.

The liquid oil delivered through the pipe $t$ to the exhausting column M contains a relatively high percentage of high boiling components compared to the vapor in the space above the same fractionating plate D from which the liquid oil is withdrawn. However, the hot liquid oil on the plate D is in substantial equilibrium with the vapor above it and in contact therewith, and contains an appreciable or substantial quantity of low boiling components, which latter it is the object of my invention to remove.

The valve $v$ is opened sufficiently to permit withdrawal at suitable rate of liquid oil from the column C into the upper end of the column M, the remainder of the oil upon such fractionating plate D of the column C passing downwardly through the reflux pipes 3. The portion withdrawn through the pipe $t$ descends through the column M, coming into contact with super-heated steam, which, in bubbling through the liquid fraction on the plates D of the column M, causes vaporization of the aforesaid low boiling components which pass off through the pipe $x$ either through the cooler or condenser $K^1$ to storage or elsewhere, or back into the main column C. Liquid oil, stripped or free of the aforesaid low boiling components, collects in the bottom of the column M and is withdrawn therefrom through the pipe $w$ to storage tank $S^1$.

Similarly a second fraction or side stream is operated upon through exhausting column N, the liquid bottoms from which are delivered to the storage tank $S^2$ while the vapors of the low boiling components are delivered through the pipe $z$ either back into the column C, or through the cooler $K^3$ to any desired destination.

In the case of both columns M and N the vapors of the low boiling components liberated therein may be divided, part returning to the column C and part through the coolers $K^1$ and $K^3$ to suitable destinations.

By way of example, it may be stated that the oil charged through the pipe $c$ into the still may be Gulf Coast crude yielding bottoms in the main column C of asphalt delivered to storage tank S. The bottoms from the exhausting column M may then be heavy lubricating oil delivered to the storage tank $S^1$. The bottoms from the exhausting column N may be light lubricating oil, and the overhead from the column C is light distillate delivered to the tank $S^3$.

Both the heavy lubricating oil and light lubricating oil, resulting from treatment of fractions or side streams in the exhausting structures M and N have, by the method indicated, been materially improved as to flash test and, therefore, as to their value, by driving off therefrom in the exhausting sections M and N the low boiling constituents otherwise remaining therein.

While in the arrangement of Fig. 1 the exhausting structure as M or N is disposed outside of the main fractionating column C, my method may be practiced by exhausting structure disposed within the main column C, as indicated in Fig. 2, where the fractionating structure again comprises the fractionating plates D, the vapor up-takes 1, bubbler caps 2 and reflux liquid down-take pipes 3. The exhausting section or column O is comprised in the annular space between the wall of the column C and the internal substantially centrally placed pipe or tubular structure R open at both ends and upwardly through which pass the vapors operated upon in the main column C. The plate $D^1$ is not provided with vapor uptakes or down-flow pipes, but forms a continuous or solid bottom for the exhausting section O. In the exhausting section R, between it and the inner wall of the column C, is disposed any suitable number of fractionating plates $D^2$ provided, respectively, with vapor uptakes 11, bubbler caps 22 and down-take reflux pipes 33.

The plate D above the auxiliary exhausting section O is not provided with the usual reflux pipe 3. On the contrary, the reflux liquid collects upon the plate D, immediately above the exhausting section O, passes off through the pipe 35, controlled by valve 36, around or past the exhausting section O and is returned into the column C on to the plate D immediately below exhausting section from which reflux liquid courses downwardly through the pipes 3 in the usual manner. The pipe 35 has a branch 37, controlled by valve 38, whereby all or any suitable portion of the liquid passing off through the pipe 35 is delivered into exhausting section O, the fraction or cut so delivered to the section O passing downwardly through its pipes 33, while there is passed upwardly through the section, super-heated steam, or equivalent, delivered through the pipe 39. The separated vapors of the low boiling components of the oil delivered into the exhausting section O through the pipe 37 pass upwardly through the vapor uptakes 1 of the fractionating plate D immediately above the exhausting section O, and thence continue on upwardly through to column C in contact with the reflux oil in mixture with the vapor rising through the tubular structure R. The bottoms or oil stripped of the low boiling components is discharged from the bottom of the exhausting section O through the trapped pipe 40.

It will be understood that any suitable number of exhausting sections, such as O, may be built into the column C at suitable elevations or suitable relative positions therein, the mode of operation and results being in general similar to those described in the system of Fig. 1.

Wherever steam or super-heated steam is utilized as hereinbefore described, it will be understood that any other suitable equivalent material may be utilized, such, for example, as gases, uncondensible still gases, illuminating gas, etc. It will, therefore, be understood that in the appended claims the term "steam" is utilized for brevity to include steam and its equivalents.

In one aspect my invention is characterized by the fact that a side stream or fraction, other than the bottoms and other than the lowest boiling vapor taken off from a fractionating column or equivalent, is operated upon to remove low boiling components, yielding an intermediate cut or fraction of materially higher flash point.

In another aspect my invention is characterized by the fact that in a fractionating system the reflux oil is divided, a portion continuing on as the reflux liquid in the fractionating system, while the other portion is withdrawn and subjected to treatment for removal of low boiling components, yielding a fraction or cut whose flash point has been materially raised.

What I claim is:

1. In the art of fractionally distilling hydrocarbon oils, the method which comprises passing vapors of the oil counter current to and in contact with reflux oil, withdrawing a portion of the reflux oil intermediate the lightest and heaviest fractions, passing the reflux oil so withdrawn counter current to steam in contact therewith to remove low boiling components, thereby yielding an intermediate fraction of higher flash point, and continuing the other portion of the reflux oil counter current to the vapors in an earlier stage of the fractionating system.

2. In the art of fractionally distilling hydrocarbon oils, the method which comprises passing vapors of the oil counter current to and in contact with reflux oil, withdrawing a portion of the reflux oil intermediate the lightest and heaviest fractions, subjecting the reflux oil so withdrawn to direct contact with steam to separate low boiling point components, returning the vapors of the separated low boiling components into the fractionating system, and continuing the other portion of the reflux oil counter current to the vapor in an earlier stage of the fractionating system.

3. The method of producing lubricating oil from petroleum which comprises passing vapors of the oil counter-current to and in contact with reflux oil, withdrawing a portion of the reflux oil intermediate the lightest and heaviest fractions, passing reflux oil so withdrawn counter-current to steam and in contact therewith to remove therefrom low boiling components, thereby yielding a lubricating oil of higher flash point, continuing the other portion of the reflux oil counter-current to the vapors in an earlier stage of the fractionating system, and withdrawing from said fractionating system a residual oil heavier than said lubricating oil.

4. The method of producing lubricating oil from petroleum containing asphalt which comprises passing the oil partially vaporized into a fractionating system wherein the vapors pass counter-current to and in contact with descending reflux oil, withdrawing a portion of the reflux oil intermediate the lightest and heaviest fractions, passing said portion counter-current to steam in contact therewith to remove low boiling components therefrom, thereby yielding an intermediate fraction of lubricating oil having high flash point, and withdrawing from the bottom of said system an asphaltic residuum.

JOSEPH W. LEWIS, Jr.